July 10, 1934.  W. L. GOODMAN  1,966,117
DOUGHNUT COOKING MACHINE
Filed June 7, 1933  5 Sheets-Sheet 5
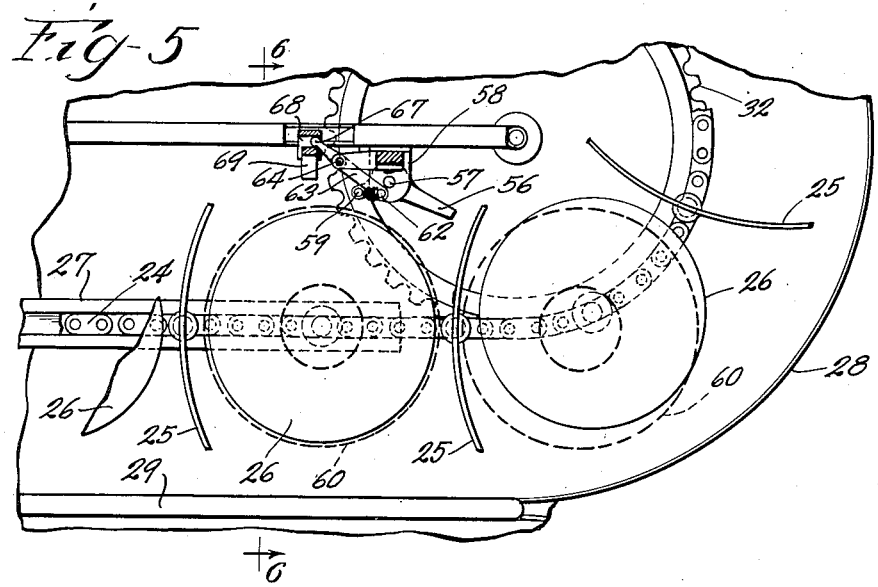
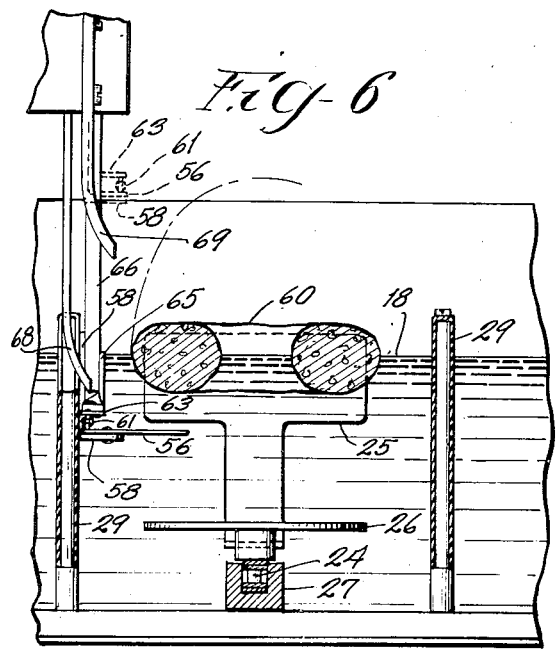
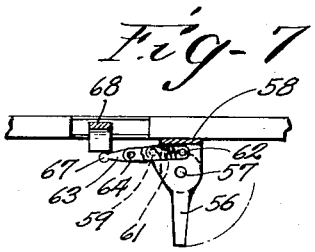
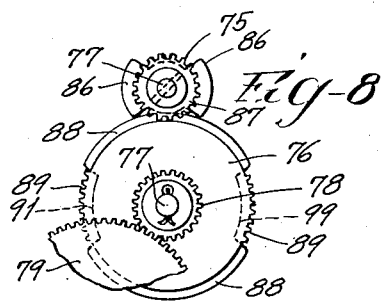
Inventor.
William Lee Goodman
By: Carl S. Lloyd
Atty.

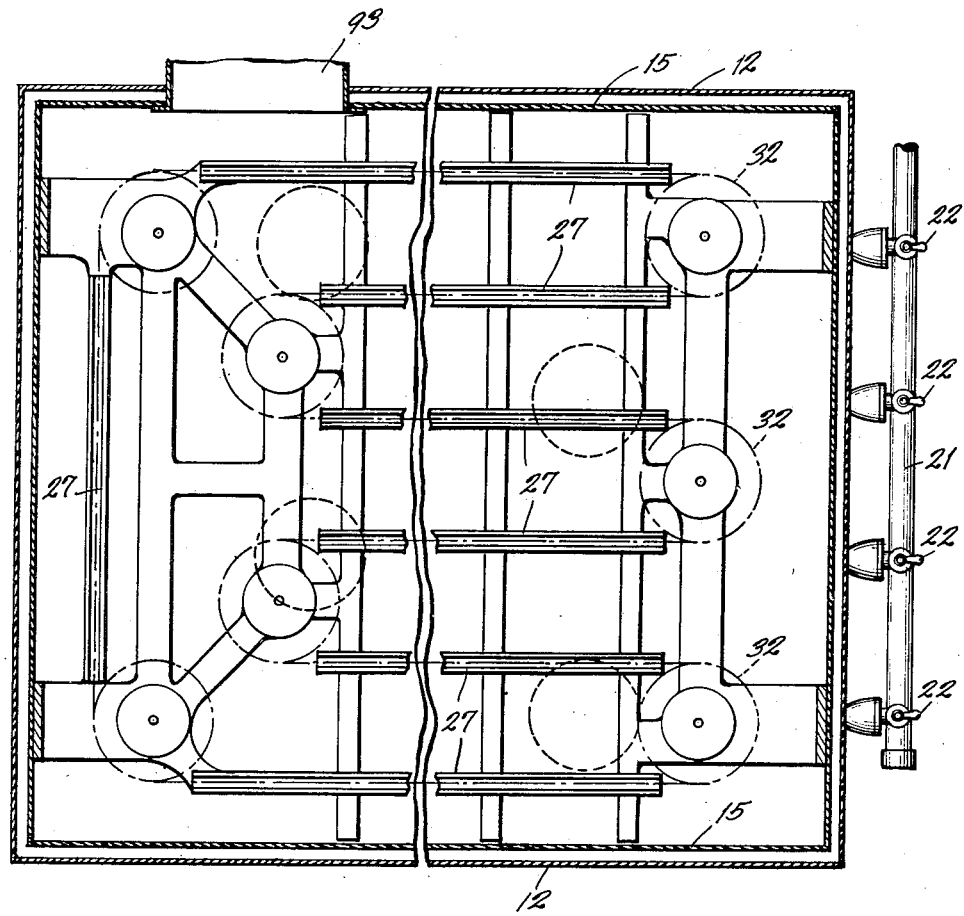

Patented July 10, 1934

1,966,117

UNITED STATES PATENT OFFICE 1,966,117

DOUGHNUT COOKING MACHINE

William Lee Goodman, Chicago, Ill., assignor to Bear-Stewart Company, Chicago, Ill., a corporation of Illinois Application June 7, 1933, Serial No. 674,632

5 Claims. (Cl. 53—7)

This invention relates to doughnut cooking machines, and has, among its objects, the provision in a machine of this character of a novel turning mechanism; a single, continuously moving conveyor by which the doughnuts are directed through the machine and supporting plates movable with the conveyor; a novel form of doughnut propelling members specially constructed to cooperate with the doughnut turning means; and means for discharging the doughnuts sidewise from the conveyor without lifting them from the position which they occupy when being propelled by the conveyor.

Other objects and advantages of the invention will be apparent as it is better understood from the following description, which, taken in connection with the accompanying drawings, discloses a preferred embodiment thereof.

Referring to the drawings:

Fig. 4 is a horizontal section taken substantially on the section line 4—4 of Fig. 1;

Fig. 5 is an enlarged detail, in plan, of a portion of the conveyor showing portions of the doughnut turning mechanism;

Fig. 6 is a vertical section taken substantially on the section line 6—6 of Fig. 5;

Fig. 7 is a detail view of the doughnut turning finger and the actuating lever and spring by which it is turned on its pivot for a purpose which will hereinafter appear; and Fig. 8 is a detail view of the mutilated gearing by which the plunger carrying the turning finger is intermittently operated.

Figure 3:
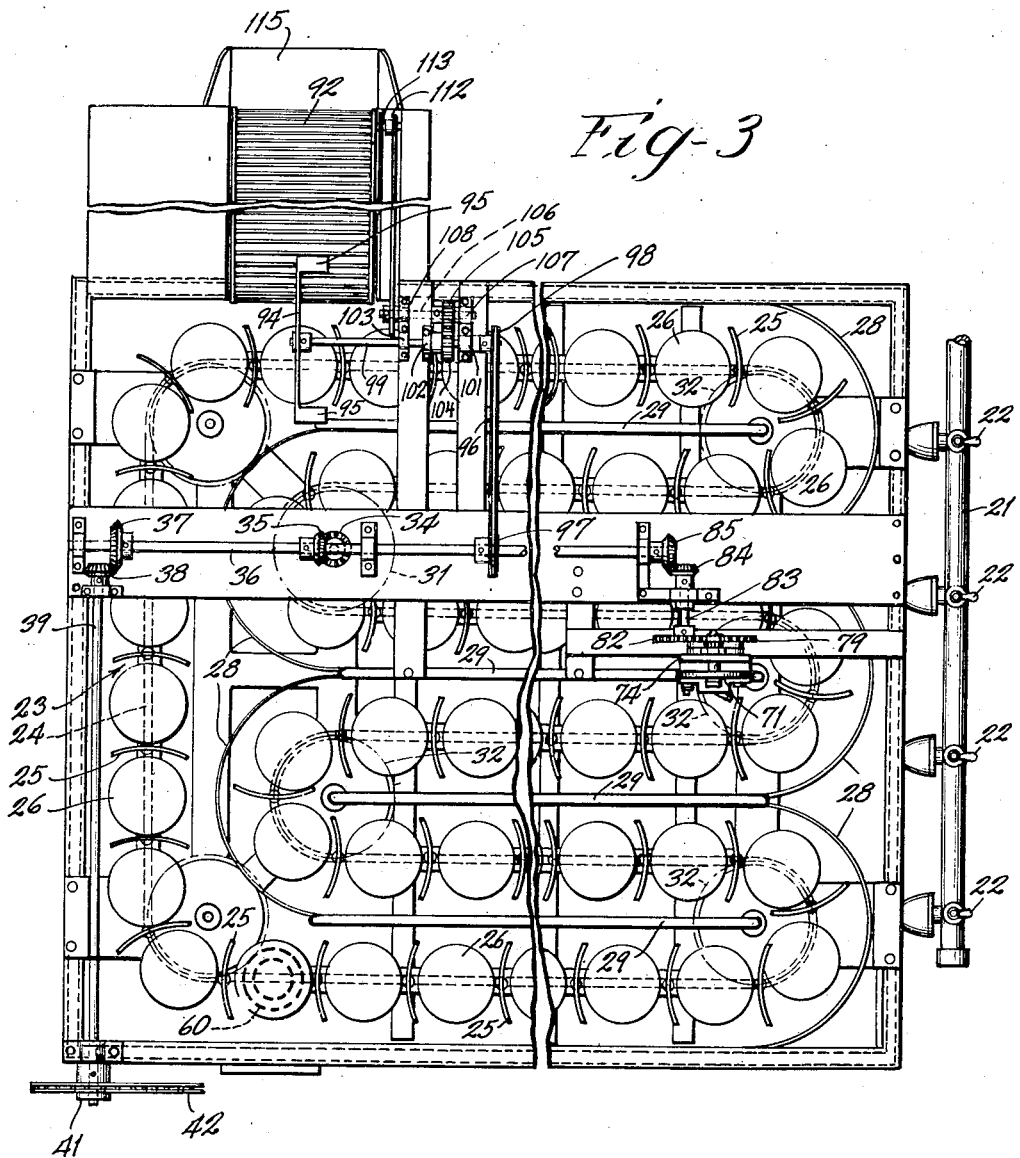
Fig. 3 is a plan view of the conveyor and certain of the operating mechanism of the machine, this view being also broken to conform to space requirements.

Upon said drawings, illustrating the best manner in which I have thus far contemplated applying the principles of the invention, the reference character 11 indicates a frame comprising a skirt portion 12, legs 13, connected by a cross piece 14, and a tank 15, supported from the top of the skirt 12, the vertical walls of said tank having a horizontal flange 16 overlying a horizontal flange 17 on the upper end of said skirt 12. The tank 15 is adapted to contain the fat or grease in which the doughnuts are cooked, the liquid level being indicated by the reference numeral 18. Burners 19 are positioned beneath the tank 15 and are served by a gas supply pipe 21, the admission of gas to the individual burners being controlled by valves 22. A single endless conveyor indicated generally by the numeral 23 is positioned in the tank 12, and comprises a chain 24 carrying a plurality of T-shaped propeller blades 25 extending upwardly therefrom, said conveyor also carrying a plurality of supporting plates 26 positioned between said blades and movable with the conveyor. The chain 24 runs in tracks 27, shown particularly in Fig. 4, and follows a circuitous path, as illustrated in Fig. 3, the path being defined by arcuate end walls 28 and hollow partitions 29, whereby lateral displacement of the doughnuts is prevented until they reach the point of discharge to be later described.

Figure 1:
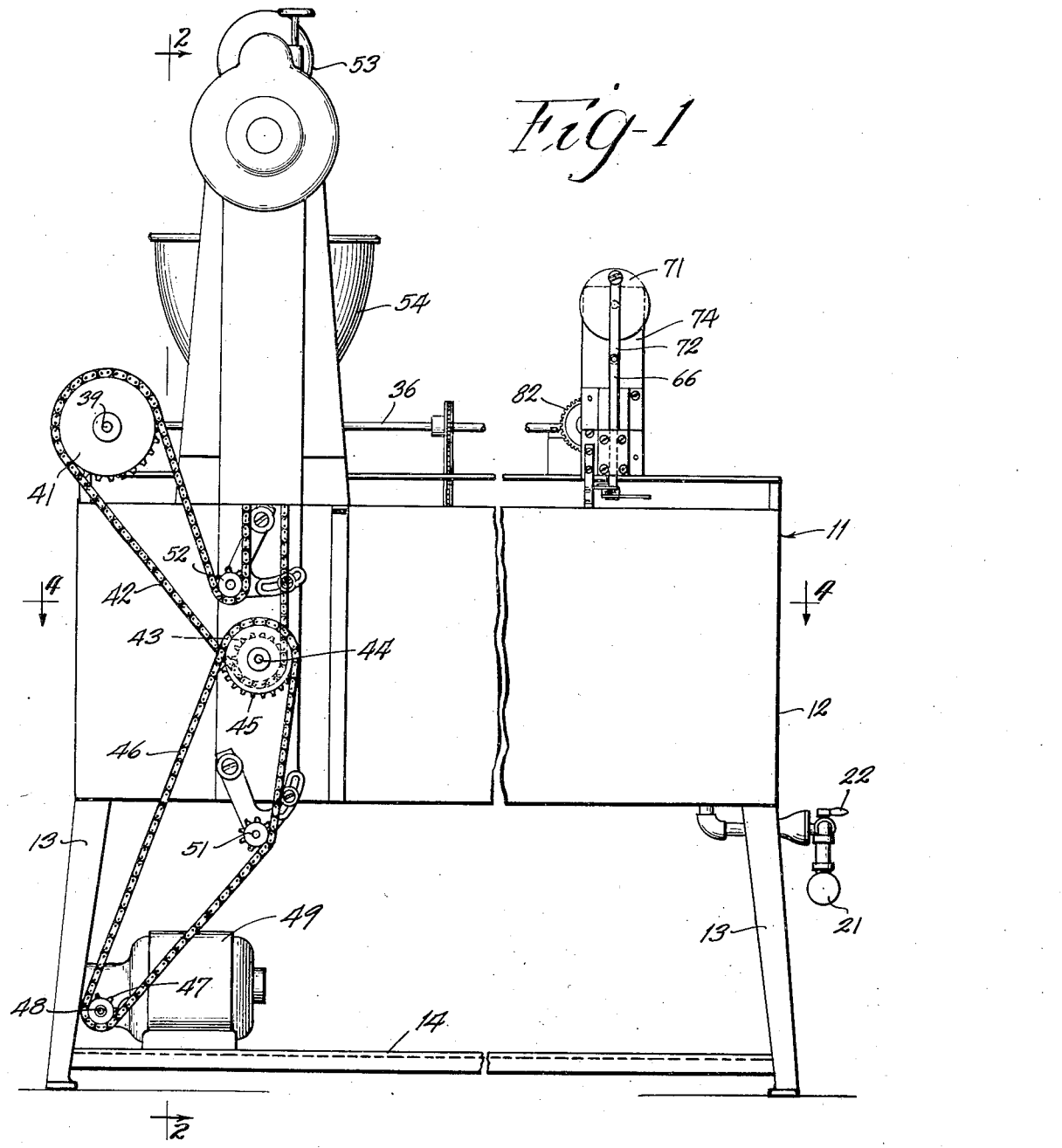
Fig. 1 is a side elevation, partly broken away, of a machine in which my invention is embodied.

The conveyor is propelled by means of a driven sprocket 31 and takes over idler sprockets 32, the driven sprocket being carried at the lower end of a vertical shaft 33, which carries at its upper end a bevel 34 meshing with a similar gear 35 carried upon a horizontal shaft 36, which has fixed thereon, near one end thereof, a bevel gear 37 meshing with a bevel gear 38 carried upon a horizontal shaft 39 extending at right angles to the shaft 36, said shaft 39 having a sprocket 41 at its outer end driven by means of a chain 42 taking over a sprocket 43 on a horizontal shaft 44, which also carries a sprocket 45 driven by means of a chain 46 taking over a sprocket 47 carried by a shaft 48, which is driven by a motor 49 shown in Fig. 1 of the drawings. A chain tightener 51 is provided for taking up slack in the chain 46, and a similar device 52 is positioned for engagement of the chain 42, the latter, as shown in Fig. 1, extending upwardly to operate a cutter mechanism contained in a housing 53. Said cutter mechanism is not shown in detail since it is known in the art, and it will suffice to say that it operates in a funnel-shaped receptacle 54 to suitably form the dough contained in said receptacle and to cause the uncooked doughnuts to drop periodically through a discharge passage 55 into the liquid, the operation of said cutting mechanism and of the conveyor being so timed that one of the uncooked doughnuts is dropped above each of the plates 26 as the latter are successively presented beneath the cutter mechanism which is positioned at the corner of the machine shown at the lower left in Fig. 3, the position of the doughnut upon first being deposited being indicated in dash lines.

The dough, upon being dropped into the liquid, strikes one of the plates 26 and is prevented thereby from sinking below a certain point in the tank. Inasmuch as the plates are carried by the conveyor, the doughnut forms are in no way retarded by falling upon said plates, but move forwardly with the conveyor, being advanced by the blades 25. The doughnut forms continue along the circuitous path of the conveyor until they reach an approximately central point in their travel, when they are turned by a mechanism shown generally at the right center of Fig. 3 and in more detail in Figs. 5 to 8 of the drawings.

Said mechanism comprises a turning finger 56 which is pivoted at 57 to a plate or bracket 58, and carries an upwardly-extending pin 59 connected by a spring 61 with a pin 62 extending downwardly from a lever 63 which is pivoted at 64 to a bracket 65, both the bracket 58 and the bracket 65 being secured to the lower end of a plunger 66 which is mounted for periodic vertical reciprocation for a purpose which will presently appear. Said lever 64 has a tail portion 27 adapted to be acted upon by two cam members identified by the reference numerals 68 and 69, respectively, said members being fixedly positioned adjacent said plunger 66. On the upward stroke of the plunger 66 the finger 56 engages the under side of the doughnut, identified by the reference numeral 60, lifting it upwardly and turning it, the forward edge thereof following the path indicated by the dot-and-dash line in Fig. 6, and the doughnut, after being turned, assuming substantially the same lateral position in the conveyor that it formerly occupied.

As the plunger reaches the upper end of its stroke, the tail portion 67 of the lever 63 engages the cam 69, which moves the lever in clockwise direction (viewing Figs. 5 and 7), thereby moving the pin 62 across the pivot 57 of the finger 56, thus changing the direction of effect of the spring 61 in the manner of a snap switch, and causing movement of the finger 56 from the position shown in Fig. 7 to that shown in Fig. 5.

Upon downward movement of the plunger, said tail portion 67 of the lever 63 engages the front face of the cam 68 and is moved in counterclockwise direction, carrying the pin 62 to the opposite side of the pivot 57 and causing the spring 61 to turn the finger 56 to the position shown in Fig. 7. This action does not occur, however, until said finger is beneath the normal position of the doughnut in the liquid 18, the finger then being in position to turn the next doughnut upon upward movement of said plunger 66.

The plunger 66 is intermittently operated by means of a crank disc 71 to which said plunger is connected by means of a link 72. Said crank disc 71 is carried on a shaft 73 journaled in a frame plate 74 and carrying a mutilated gear element 75 cooperating with a companion mutilated gear element 76, which is mounted on a stud 77 and is rigid with a pinion 78 meshing with an idler gear 79 carried by a stud 81, said idler gear 79 being driven by a gear 82 mounted on a shaft 83 having a bevel gear 84 at its opposite end meshing with a bevel gear 85 on the shaft 36.

Reverting to the mutilated gear elements 75 and 76 (Fig. 8), it will be noted that the element 75 consists of a pair of cam wings 86 and a pinion 87, and the element 76 consists of cam portions 88 and gear segments 89. It will be evident that with the element 76 continuously rotating, the element 75 will be rotated only when the gear segments 89 are in mesh with the pinion 87, at which time the cam wings 86 engage in coordinated cut-away portions 91 formed in the periphery of the gear element 86. The arrangement is such that each of said gear segments 89 causes a 180° rotation of the pinion 87, one such rotation raising the plunger 66 and the other lowering it, both such movements being rapid, and there being substantial rest periods therebetween. While the mechanism for effecting 180° movements of the gear which actuates the plunger 66 and rest periods in succession may be varied without departing from the principle involved, it has been found preferable, in constructing the apparatus shown in the drawings, to provide for relatively long rest periods and short periods of movement of the plunger. This arrangement causes a rapid descending movement of the finger 56 after one of the plates 26 passes the turnover station, the T-shaped construction of the blades 25 permitting the turning of the finger from the position shown in Fig. 5 to that shown in Figs. 6 and 7. The finger then rests in the latter position a sufficient time to permit the succeeding doughnut to move into position above said finger, whereupon the finger is rapidly raised and flips the doughnut over, as indicated in Fig. 6. As the plunger reaches the upper end of its stroke, said finger 56 is turned by the cam 69 to the position shown in Fig. 5, as previously explained, and rests in this position pending the next descent.

Figure 2:
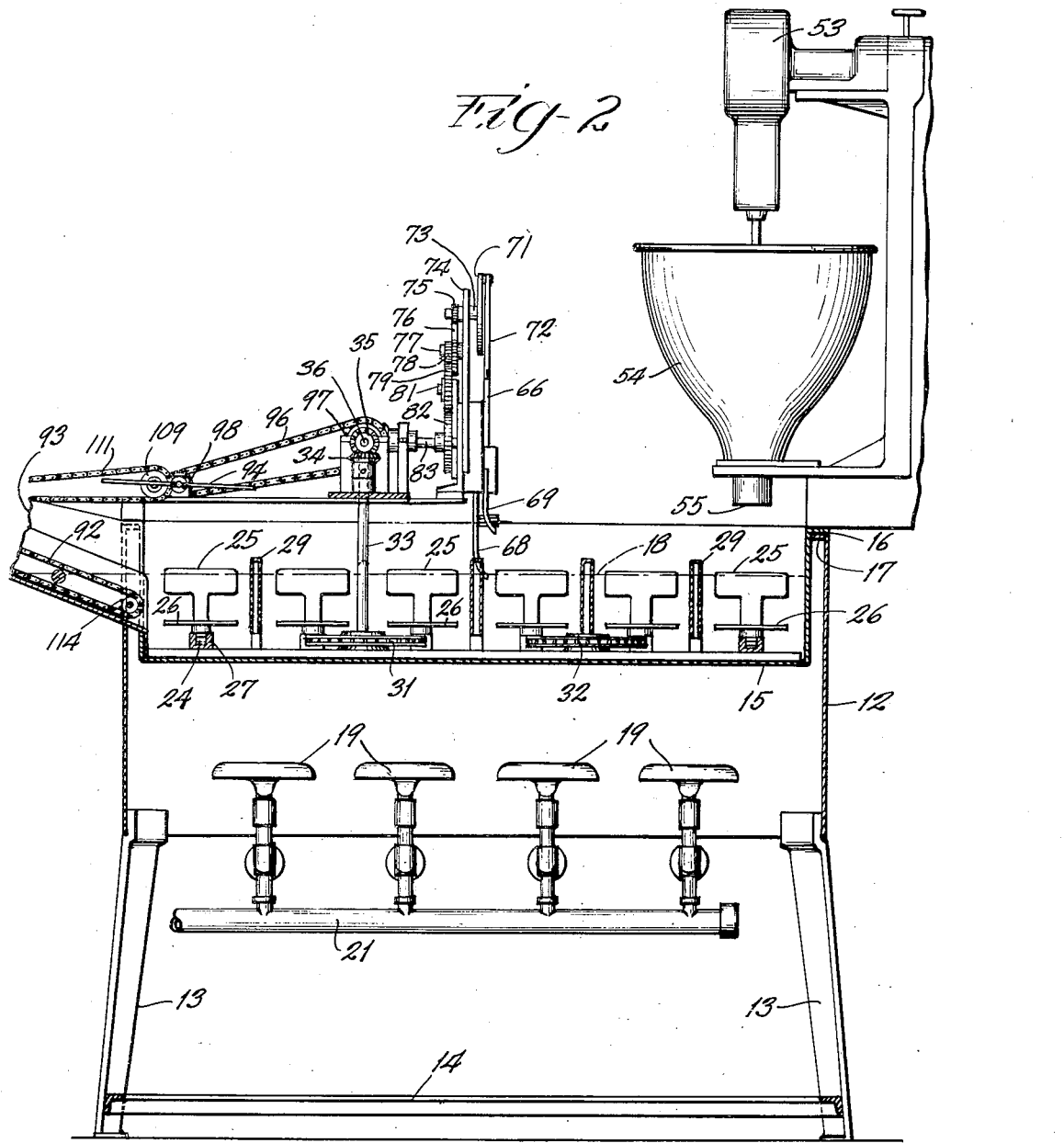
Fig. 2 is a sectional view taken substantially on the section line 2—2 of Fig. 1.

After passing the turnover station, the doughnuts are directed further through the machine to cook the other side thereof, and are automatically ejected when they reach a discharge station, shown at the upper left hand corner of Fig. 3 and at the left in Fig. 2. It will be observed, by reference to these figures, that a discharge conveyor 92 extends laterally from the machine, being mounted in an upwardly inclined channel 93, and having its lower end beneath the level of the hot grease, indicated by the reference numeral 18. As the doughnuts arrive at this station, they are moved sidewise onto said conveyor by means of a rotating paddle 94 having blades 95 at its opposite ends, the rotation of said paddle being timed so that one of said blades ejects a doughnut from one flight of the conveyor, and the other from the next succeeding flight. The arrangement is such that the doughnuts need not be lifted in order to be discharged, but are merely moved sidewise out of the conveyor 23 onto the discharge conveyor 92, the receiving end of which is located substantially at the level of the underside of the doughnuts as they float in the hot grease contained in the tank 15.

The mechanism for operating the discharge paddle 94 and the discharge conveyor 92 is illustrated in said Figs. 2 and 3, from which it will be observed that a chain 96 taking over a sprocket 97 carried on the shaft 36 drives a sprocket 98 on a shaft 99 journaled in bearings 101, 102 and 103, the discharge paddle 94 being secured to the outer end of said shaft 99. It will thus be apparent that said discharge paddle is continuously rotated at such speed as may be determined by the gearing employed.

The shaft 99 carries also a gear 104 meshing with a gear 105 on a short shaft 106 journaled in bearings 107 and 108, said shaft carrying at its outer end a pulley 109, over which a belt 111 is directed, said belt taking over a pulley 112 at its opposite end, which pulley is mounted on a shaft 113 carrying driving sprockets (not shown), over which the conveyor 92 is directed, said conveyor at its opposite end taking over idler sprockets 114, one of which is shown in Fig. 2 of the drawings. It will thus be apparent that the conveyor 92 and the discharge paddle 94 may be operated in timed relation to the movement of the conveyor 23, and that the latter may be timed so as to keep the doughnuts in the hot grease a sufficient length of time to properly cook them; also that the turning mechanism is located substantially midway in the course of travel of the doughnuts so that they may be cooked on each side for substantially equal periods. Upon being discharged from the conveyor 92, said doughnuts will drop into a tray 115 or any other suitable receptacle provided to receive them.

It will be noted that only a single conveyor is required for the complete cooking operation and that, with the construction shown, this conveyor may move continuously, thus eliminating the slow speed of intermittent or step motion. Furthermore, the plates 26, which prevent the doughnuts from being submerged too far in the cooking liquid, move with the conveyor so that it is not necessary to halt the conveyor in order to allow the doughnuts to rise to the surface after being submerged. The turning device automatically turns the doughnuts at the proper time without moving them from the section of the conveyor in which they are traveling, and the construction and operation of the device are such that the turning finger avoids contact with the doughnuts or the blades of the conveyor on its descent, and is turned into operative position only after it is moved below the level of the doughnuts in the cooking liquid. The T-shaped construction of the blades 25 permits this turning action without interfering with the progress of the conveyor. At the discharge station the doughnuts are moved laterally away from the main conveyor onto a discharge conveyor without the necessity of lifting them, and the cooked doughnuts are thereafter directed into a suitable receptacle.

By reason of its novel features of construction, the machine has exceptional capacity for its size, and operates with a high degree of efficiency without requiring complicated or expensive mechanism, the mechanical parts employed having been reduced to a minimum.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the construction hereinbefore described being merely a preferred embodiment thereof.

I claim:—

1. A doughnut cooking machine comprising a receptacle for cooking liquid, a doughnut former positioned and operable to deposit doughnuts in the liquid at a predetermined point and at definite intervals, a single, continuously moving conveyor for directing the doughnuts through the machine, and a device located in the course of travel of the doughnuts for turning them over, said device being intermittently operable and adapted to turn the doughnuts in the section of the conveyor in which they travel to said turning device.

2. A doughnut cooking machine comprising a receptacle for cooking liquid, means for depositing uncooked doughnuts in the liquid at a predetermined point and at definite intervals, a conveyor for directing the doughnuts through the machine, and a device located in the course of travel of the doughnuts for turning them over, said device comprising a vertically reciprocable pivoted member, means for operating said member to produce timed up and down movements of said member with rest periods between said movements, means for turning said member upon its pivot near the lower end of its stroke to position it for engagement of a doughnut on the upward stroke, and for turning it in the opposite direction upon its pivot near the upper end of its stroke to cause it to clear the conveyor and doughnuts carried thereby on the downward stroke.

3. A doughnut cooking machine comprising a receptacle for cooking liquid, means for depositing uncooked doughnuts in the liquid at a predetermined point and at definite intervals, a conveyor for directing the doughnuts through the machine, and a device located in the course of travel of the doughnuts for turning them over, said device comprising a vertically reciprocable pivoted member, means for operating said member to produce timed up and down movements of said member with rest periods between said movements, means for turning said member upon its pivot near the lower end of its stroke to position it for engagement of a doughnut on the upward stroke, and for turning it in the opposite direction upon its pivot near the upper end of its stroke to cause it to clear the conveyor and doughnuts carried thereby on the downward stroke, said means including a pin on said pivoted member, a pivoted actuating lever, a pin on said lever, a spring connecting said pins and cams for actuating said lever to carry the pin thereon across the pivot point of said member to cause said spring to turn said member on its pivot with a snap action.

4. A doughnut cooking machine comprising a receptacle for cooking liquid, means for depositing uncooked doughnuts in the liquid at a predetermined point and at definite intervals, a conveyor for directing the doughnuts through the machine, and a turning device located in the course of travel of the doughnuts and having a reciprocating and pivotal movement for successively turning the doughnuts, said conveyor having a series of propelling blades of T-shaped construction adapted to permit pivotal movement of said turning device beneath the liquid level.

5. A doughnut cooking machine comprising a receptacle for cooking liquid, means for depositing uncooked doughnuts in the liquid at a predetermined point and at definite intervals, a conveyor for directing the doughnuts through the machine as they are cooked, a device for turning said doughnuts in their course of travel through the machine, and means for discharging the cooked doughnuts by a movement at substantially right angles to the direction of movement by the conveyor and with an initial movement in substantially the same plane as that in which they travel when being propelled by the conveyor.

WILLIAM LEE GOODMAN.